United States Patent [19]
Ross et al.

[11] Patent Number: 5,554,895
[45] Date of Patent: Sep. 10, 1996

[54] ELECTRONIC LATCHING CIRCUIT FOR MOMENTARY CONTACT SWITCHES

[75] Inventors: Michael E. Ross, Clayton, N.C.; Mark G. C. Robinson, Cedar Rapids, Iowa

[73] Assignee: Eaton Corporation, Cleveland, Ohio

[21] Appl. No.: 382,543

[22] Filed: Feb. 2, 1995

[51] Int. Cl.⁶ .................................................. H01H 7/08
[52] U.S. Cl. ..................... 307/141; 307/132 R; 307/139; 307/142; 192/4 R; 364/426.04; 327/385; 327/392
[58] Field of Search ................................. 307/141, 142, 307/139, 132 R; 324/418; 73/2; 440/75; 192/4 R; 364/426.04; 327/385, 392; 370/190

[56] References Cited

U.S. PATENT DOCUMENTS

| | | | |
|---|---|---|---|
| 4,316,395 | 2/1982 | Brown | 74/866 |
| 4,403,970 | 9/1983 | Dretzka et al. | 440/75 |
| 4,720,763 | 1/1988 | Bauer | 361/154 |
| 5,040,407 | 8/1991 | Hinckley et al. | 73/2 |
| 5,051,604 | 9/1991 | Hurley | 307/142 |
| 5,065,101 | 11/1991 | Ledbetter | 324/418 |
| 5,196,731 | 3/1993 | Abe et al. | 307/115 |

OTHER PUBLICATIONS

Signetics 555 Timer Specification, prior to 1987, pp. 1–7.

Primary Examiner—William M. Shoop, Jr.
Assistant Examiner—Albert W. Paladini
Attorney, Agent, or Firm—Quarles & Brady

[57] ABSTRACT

A switch circuit for activating and deactivating a motor vehicle cruise control includes a 555 model timer integrated circuit which has a trigger terminal, a reset terminal, a threshold terminal, a control voltage terminal and an output terminal. A substantially constant voltage is applied to the threshold terminal. A first normally-open switch connected between the vehicle ground and the trigger terminal, and a second normally-open switch connected between vehicle ground and the reset terminal. Separate pull-up resistors connect the trigger and reset terminals of the timer to a positive voltage source and a capacitor couples the control voltage terminal to vehicle ground. A relay has a coil connected between the output terminal and vehicle ground, and has a switch that is connected between the common terminal and the ON control terminal of the cruise control. The 555 timer is configured as a latching circuit having an output which toggles in response to operation of the two normally-open switches.

6 Claims, 1 Drawing Sheet

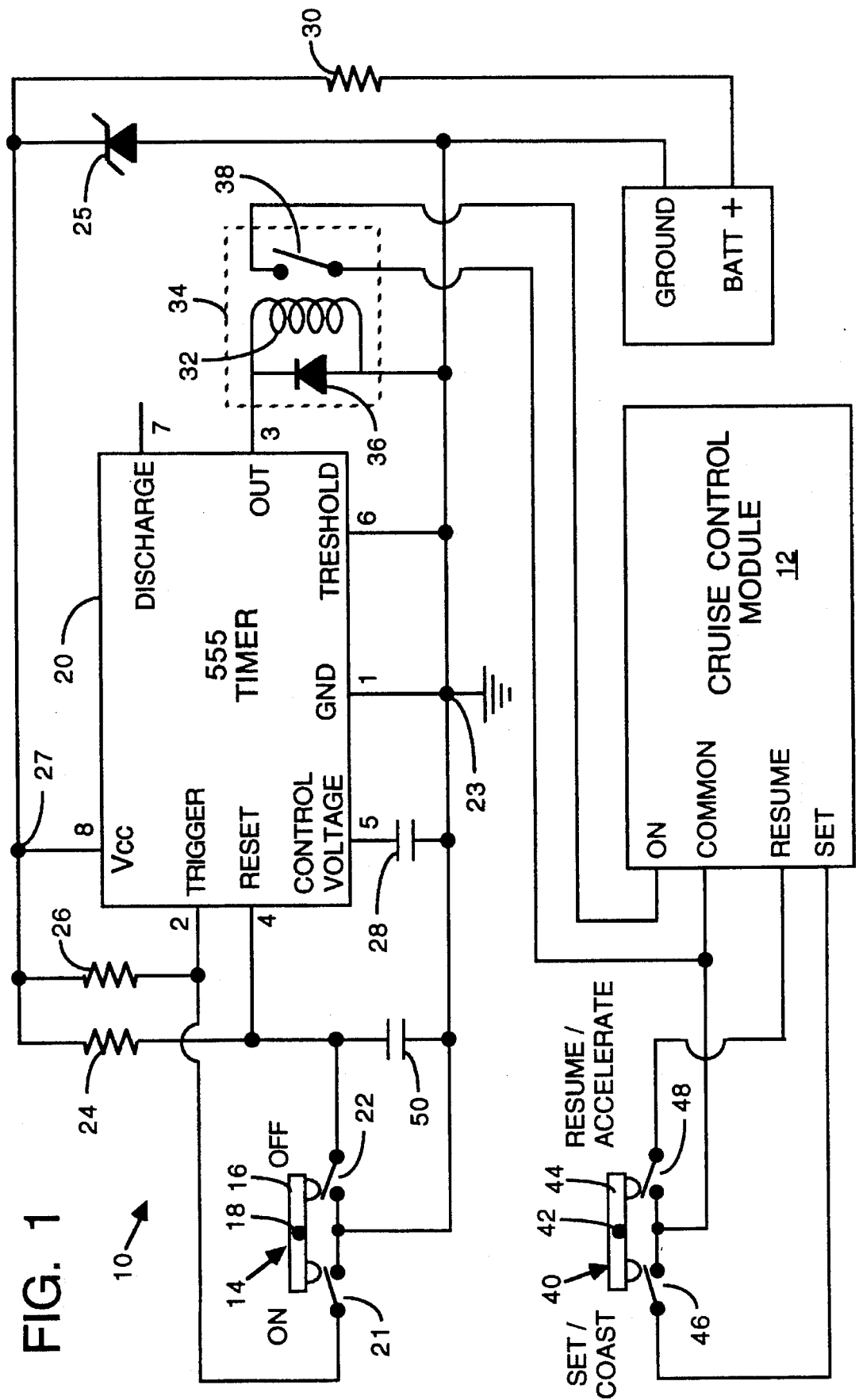

ELECTRONIC LATCHING CIRCUIT FOR MOMENTARY CONTACT SWITCHES

BACKGROUND OF THE INVENTION

The present invention relates to electrical circuits which produce an output signal that has one of two signal levels determined in response to input signals from a pair of momentary contact, normally open switches; and more particularly, to such circuits for use in operating a cruise control system of a motor vehicle.

A motor vehicle often has a cruise control to maintain the speed of the vehicle at a relatively constant level set by the vehicle driver. The circuitry of a typical cruise control has an input to which a given voltage level must be applied continuously in order for the cruise control to remain activated. That input usually is connected to a switch that is stable in both the open and closed states, at which the cruise control is turned on and off respectively. A normally open switch also is provided for setting the vehicle speed to be maintained and for disabling the cruise control so that the vehicle can coast. Another normally open switch is alternately operated to resume cruise control operation from the vehicle coasting mode and to increase the set speed during normal operation to accelerate the vehicle.

In order to minimize a number of individual actuator elements that the vehicle driver must locate and operate, it is proposed to combine the normally open switches as part of a rocker switch mechanism. This allows the vehicle driver to push one side of the rocker mechanism to operate one normally open switch and to push on the other side of the rocker mechanism to operate the other normally open switch. When released by the vehicle driver, the rocker mechanism returns to a center position in which both of the normally open switches are in an open state.

It is preferable to provide a similar appearing and operating rocker switch to turn on and off the cruise control and thus use momentarily closing, normally open switches for that purpose. However, the on-off input to a conventional cruise control circuit requires a continuous voltage level to maintain the circuit in the activated state and momentarily closing, normally open switches do not provide that required continuous voltage level.

As a result, additional circuitry is necessary to interface such switches to the on/off input of the cruise control. Several types of well-known electrical circuits are able to toggle an output between one of two continuous signal levels in response momentary input signals. For example, flip-flops and latching circuits provide this function and are available in integrated circuit form.

It is also desirable that the switch signal interface circuit be relatively compact in order to fit within the steering wheel of the motor vehicle. Therefore, it is not convenient to produce the interface circuit from discrete electrical components. Further, commercially available latch and flip-flop integrated circuits have packages with 14 or 16 pins making them relatively large for this application. Similarly, standard NAND or NOR gate integrated circuits, which could be used to fabricate a flip-flop or latch, also have a minimum of 14 pins. Thus, although it is desirable to use a commercially available integrated circuit to convert the cruise control switch signals, the obvious circuit components are available only in relatively large packages.

SUMMARY OF THE INVENTION

A general object of the present invention is to provide a circuit which converts signals from two momentary contact, normally open switches into an electric signal which alternates between two signal levels in response to the operation of the two switches.

Another object of the present invention is to provide such a signal conversion circuit which utilizes a standard commercially available integrated circuit with a relatively small package.

These objects are fulfilled by utilizing a well-known 555 model integrated circuit timer in a unique manner. The 555 timer has a ground terminal, a positive supply voltage terminal, a trigger terminal, a reset terminal, a threshold terminal, and an output terminal. A first normally-open switch is connected between the ground terminal and the trigger terminal, while a second normally-open switch is connected between the ground and reset terminals.

In prior applications of the 555 timer, the threshold terminal was connected to an RC circuit having a time constant that determines the timing period of the device. As a result, the voltage applied to the threshold terminal varied during conventional operation of the timer. In the present application of a 555 timer, a substantially constant voltage level is applied to the threshold terminal, for example the threshold terminal is connected to the ground terminal. However, this novel configuration of the 555 timer causes the voltage at the output terminal to toggle between high and low voltage levels with alternate operation of the two normally-open switches. The output voltage can be used as a control signal to turn on and off another device, such as the cruise control of a motor vehicle.

BRIEF DESCRIPTION OF THE DRAWINGS

FIG. 1 is a schematic diagram of a motor vehicle cruise control circuit incorporating the present invention.

DESCRIPTION OF THE PREFERRED EMBODIMENT

With reference to FIG. 1, a signal conversion circuit 10 turns on and off a conventional cruise control module 12. Specifically, a first rocker switch 14 has a rocker button 16 that pivots about a center axis 18. The rocker button 16 actuates one of a pair of momentary contacts, normally open switches 21 and 22 depending upon which side of the rocker button 16 is depressed. The two normally open switches 21 and 22 can be conventional dome-type switches mounted on a printed circuit board. Such switches have an inherent resiliency that returns the conductive dome to a normally open state once pressure exerted by the rocker button 16 is released from the dome. The first normally open switch 21 is connected between vehicle ground, from negative battery connection of the cruise control module 12, and a trigger terminal (pin 2) of a conventional 555 model timer 20. The second normally open switch 22 is connected between vehicle ground potential at node 23 and the reset terminal (pin 4) of the 555 timer 20. Both the trigger and reset terminals are coupled by separate pull-up resistors 24 and 26 to the positive regulated voltage at a second node 27 received via connection from the vehicle battery through resister 30. A Zener diode 25 regulates the voltage between nodes 23 and 27.

The 555 model timer circuit is commercially available in eight pin integrated circuit packages from a number of semiconductor manufacturers. In conventional applications, threshold terminal (pin 6) of the 555 timer receives a voltage which varies with time to define a timing period. That varying voltage typically is provided by an RC circuit that has a capacitor. The 555 timer 20 has a discharge terminal (pin 7) which normally is connected to discharge the timing capacitor at certain points in time. However in the present application, a substantially constant voltage is applied to the threshold terminal of timer 20 because that terminal is connected directly to ground at the first node 23. As used herein, the term "connected directly" refers to an electrical connection provided by a conductor which has negligible resistance and reactance. In addition, the discharge terminal of the 555 timer 20 in circuit 10, either is allowed to float. The timer's control voltage terminal (pin 5) is coupled by a capacitor 28 to vehicle ground.

An output terminal (pin 3) of the 555 timer 20 is connected to one end of the coil 32 of a reed relay 34. The other end of the coil is connected to the vehicle ground and a diode 36 is coupled across coil 32. The electromagnetic field produced by the relay coil 32 closes a reed switch 38, which is connected between the common and ON terminals of the cruise control module 12.

A second rocker switch 40 has a second rocker button 44 which pivots about center axis 42 in order to activate third and fourth momentary contact, normally open switches 46 and 48. The third normally open switch 46 is connected between the common and the set terminals of cruise control module 12. Similarly, the fourth normally open switch 48 is connected between the common and resume terminals of the cruise control module 12.

When power is initially applied to the circuit in FIG. 1, the 555 timer 20 enters a state in which the output terminal (pin 3) is held at ground potential. This is ensured because the time constant of resistor 24 and capacitor 50 slows regulated voltage rise on the reset terminal (pin 4) as compared to the trigger terminal (pin 2). Thus, the reed switch 38 is in the open position which places the cruise control module 12 in the OFF state. To activate the cruise control, the vehicle driver pushes rocker button 16 of the first rocker switch 14 in a direction which closes the first normally open switch 21. This action applies ground potential to the trigger terminal of the 555 timer which causes the internal circuitry to be triggered. The 555 timer 20 responds to this trigger terminal by applying a positive voltage to the output terminal (pin 3) which energizes the coil 32 of the reed relay 34. This action closes the reed switch 38 coupling the common terminal of the cruise control module 12 to the ON terminal, thereby activating cruise control operation.

When the vehicle driver releases the first rocker switch 14, the first normally open switch 21 opens disconnecting vehicle ground from the trigger terminal (pin 2) of the 555 timer 20 and resistor 26 applies a positive voltage to the trigger terminal. Even though a low level trigger signal no longer is being applied to the 555 timer 20, the internal timer circuitry maintains the output at pin 3 latched at a positive voltage which holds the reed switch 38 in a closed state. Thus, the output of the 555 timer holds the reed switch closed maintaining the cruise control in the ON mode. The vehicle driver then can operate the second rocker switch 40 to set the cruise control speed, or to allow the vehicle to subsequently coast and thereafter resume cruise control.

When the vehicle driver decides to deactivate the cruise control, first rocker button 16 is pressed to momentarily close the second normally open switch 22. This closure couples the reset terminal (pin 4) of the 555 timer 20 to the vehicle ground. The circuitry of the 555 timer responds by applying ground potential to the output terminal (pin 3) which de-energizes the coil of reed relay 34. This causes the reed switch 38 to open so that the common and ON terminals of the cruise control module 12 no longer are connected together. This action turns off the cruise control module 12. After the vehicle driver releases the first rocker button 16 and the second normally open switch 22 returns to an open state, the 555 timer 20 remains latched in a state at which vehicle ground is still applied to the output terminal (pin 3). Thus, the reed relay 34 remains de-energized and the cruise control module 12 remains off. The cruise control module 12 can be re-activated by once again operating the first rocker switch 14 to momentarily close the first normally open switch 21 in the manner described previously.

Thus, the present switch signal conversion circuit 10 configures the 555 model timer 20 in a unique manner in which this well-known timer does not operate conventionally as either a monostable or an astable device. Instead, the 555 timer 20 is configured to act as a latching device wherein momentary input signals cause the output state to toggle between high and low voltage levels and control the activation of the cruise control module 12.

We claim:

1. A switch circuit comprising:

a first node and a second node for receiving a DC voltage applied thereacross;

a timer comprising an integrated circuit having a trigger terminal, a reset terminal, a threshold terminal, a Vcc voltage supply terminal connected to the second node, a ground terminal connected to the first node and an output terminal at which a signal is produced which enables said switch circuit to energize a device;

a first normally-open switch connected between the first node and the trigger terminal wherein operation of the first normally-open switch activates said timer;

a second normally-open switch connected between the first node and the reset terminal wherein operation of the second normally-open switch deactivates said timer; and a circuit element connected to the threshold terminal and applying a substantially constant voltage level to the threshold terminal.

2. The switch circuit as recited in claim 1 wherein the circuit element connects the threshold terminal to the first node.

3. The switch circuit as recited in claim 1 wherein the said integrated circuit further has a control voltage terminal; and further comprising a capacitor coupling the control voltage terminal to the first node.

4. The switch circuit as recited in claim 1 further comprising a first resistor connected between the trigger terminal and the second node; and a second resistor connected between the reset terminal and the second node.

5. A switch circuit for activating and deactivating a motor vehicle cruise control which has a common terminal and an ON control terminal for receiving a voltage to activate cruise control, said switch circuit comprising:

a first node for connection to a negative terminal of a battery;

a second node for connection to a positive terminal of a battery;

a timer comprising an integrated circuit having a trigger terminal, a reset terminal, a threshold terminal connected to substantially constant voltage, a control voltage terminal, and an output terminal;

a first normally-open switch connected between the first node and the trigger terminal;

a second normally-open switch connected between the first node and the reset terminal;

a first resistor connected between the trigger terminal the second node;

a second resistor connected between the reset terminal and the second node;

a capacitor coupling the control voltage terminal to the first node; and a relay having a coil connected between the output terminal and the first node, and having a switch that is connected between the common terminal and the ON control terminal of the cruise control module.

6. The switch circuit as recited in claim 5 further comprising a rocker button for actuating said first normally-open switch and said second normally-open switch.

* * * * *